US012331963B2

(12) United States Patent
McChesney et al.

(10) Patent No.: US 12,331,963 B2
(45) Date of Patent: Jun. 17, 2025

(54) DENSITY DEPENDENT FLUID FLOW CONTROL TO MAXIMIZE THERMAL RECOVERY IN GEOTHERMAL WELLS UTILIZING SUPERCRITICAL WORKING FLUID

(71) Applicant: Halliburton Energy Services, Inc., Houston, TX (US)

(72) Inventors: Ryan W. McChesney, Carrollton, TX (US); Stephen Michael Greci, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/455,403

(22) Filed: Aug. 24, 2023

(65) Prior Publication Data

US 2025/0067482 A1    Feb. 27, 2025

(51) Int. Cl.
*F24T 10/30* (2018.01)
*F24T 50/00* (2018.01)
*F24T 10/00* (2018.01)

(52) U.S. Cl.
CPC .............. *F24T 10/30* (2018.05); *F24T 50/00* (2018.05); *F24T 2010/56* (2018.05)

(58) Field of Classification Search
CPC . F24T 10/10; F24T 10/20; F24T 10/30; F24T 2010/56; F24T 50/00; Y02E 10/10; E21B 43/12; E21B 43/164; E21B 43/166; E21B 43/168; E21B 34/06; E21B 34/08; Y02P 90/70; C09K 8/594; F03G 7/04; F03G 4/029; F03G 4/072
See application file for complete search history.

(56) References Cited

U.S. PATENT DOCUMENTS

| | | | |
|---|---|---|---|
| 6,668,554 B1 | 12/2003 | Brown | |
| 9,394,771 B2 | 7/2016 | Wiggs | |
| 9,803,626 B1* | 10/2017 | Eastman | F24T 10/20 |
| 11,041,361 B2 | 6/2021 | Fripp et al. | |
| 11,585,330 B1* | 2/2023 | Steele | F03G 4/02 |
| 11,708,818 B1* | 7/2023 | Cook | F24T 50/00 60/641.2 |
| 2021/0062615 A1* | 3/2021 | Fripp | E21B 34/08 |

FOREIGN PATENT DOCUMENTS

CN    105863568    8/2016
WO    2022198336    9/2022

OTHER PUBLICATIONS

"PCT Application No. PCT/US2023/072960, International Search Report and Written Opinion", May 14, 2024, 10 pages.

* cited by examiner

*Primary Examiner* — Loren C Edwards
(74) *Attorney, Agent, or Firm* — DeLizio, Peacock, Lewin & Guerra LLP

(57) ABSTRACT

An apparatus to be positioned in a geothermal wellbore formed in a subsurface formation. The apparatus comprises one or more components to inject a supercritical fluid into the subsurface formation. The apparatus comprises a flow control assembly configured to control flow of the supercritical fluid into the geothermal wellbore based on a density of the supercritical fluid in the subsurface formation.

19 Claims, 4 Drawing Sheets

DENSITY DEPENDENT FLUID FLOW CONTROL TO MAXIMIZE THERMAL RECOVERY IN GEOTHERMAL WELLS UTILIZING SUPERCRITICAL WORKING FLUID

FIELD

Some implementations relate generally to the field of thermal recovery from geothermal formations and more particularly to the field of controlling the flow of a supercritical working fluid from a geothermal formation.

BACKGROUND

Geothermal heat, originating from the Earth's core, may be utilized as a source of energy. A working fluid may be injected into geothermal formation, via an injection well, to be heated. The working fluid may subsequently be produced, via a production well to utilize the thermal energy captured with the working fluid. For example, once produced to the surface, the thermal energy of the working fluid may be utilized to provide the power to spin a turbine engine at a power plant. To extract heat more efficiently from geothermal formations, the geothermal formations may be hydraulically fractured to create a network of fractures in the formation and enhance the permeability of the geothermal formation. The network of fractures may increase the exposure of the working fluid to the formation heat, thus increasing the thermal conductivity between the working fluid and the formation.

BRIEF DESCRIPTION OF THE DRAWINGS

Implementation of the disclosure may be better understood by referencing the accompanying drawings.

DESCRIPTION

Figure 1:
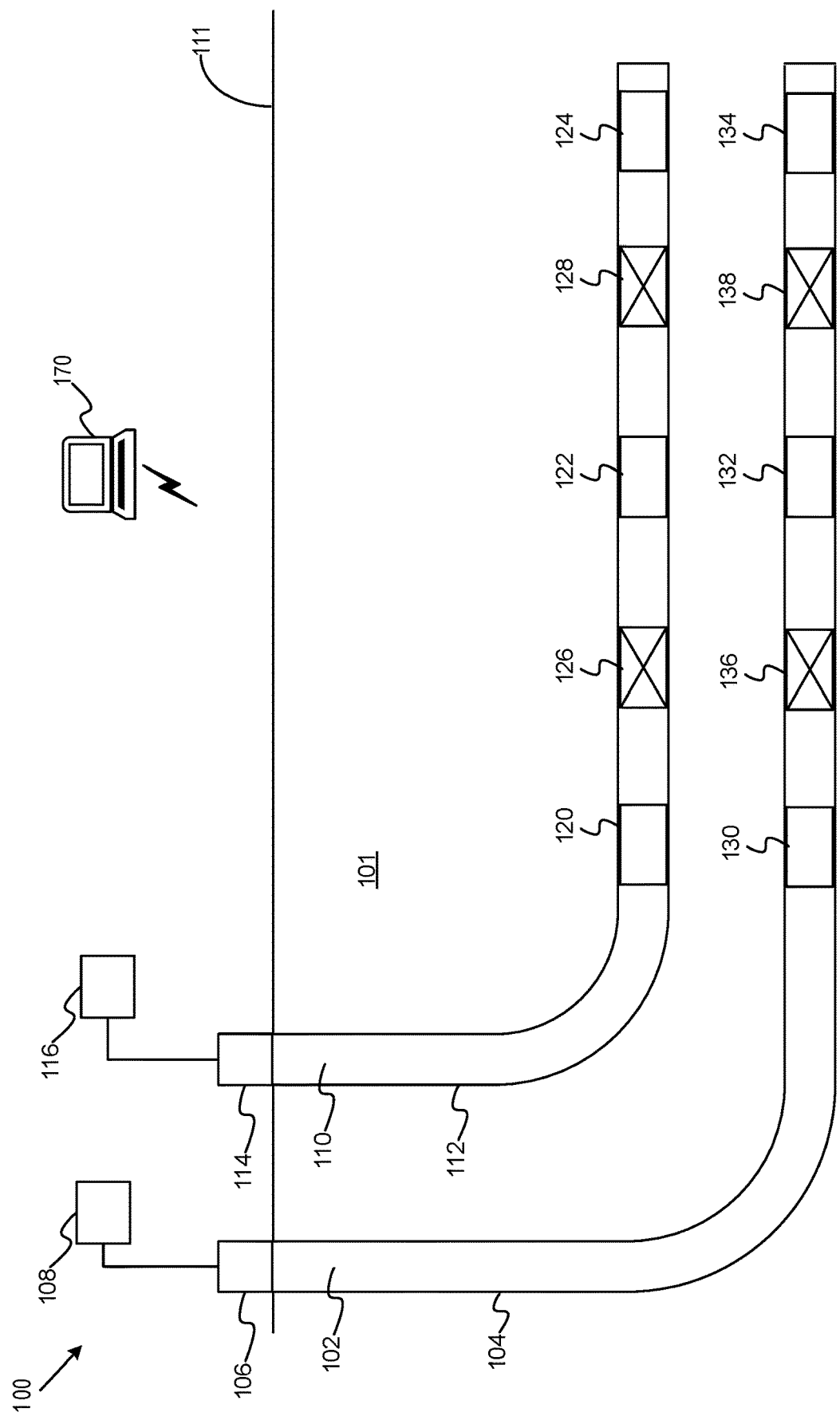
FIG. 1 is a schematic depicting an example geothermal system, according to some implementations.

The description that follows includes example systems, methods, techniques, and program flows that embody aspects of the disclosure. However, it is understood that this disclosure may be practiced without these specific details. For instance, this disclosure refers to a flow control assembly configured to control the flow of a supercritical fluid into a wellbore. Aspects of this disclosure can also be applied to any other components configured to control the flow of the working fluid into the wellbore. For clarity, some well-known instruction instances, protocols, structures, and techniques have been omitted.

Example implementations relate to a density dependent flow control of a working fluid into a wellbore to maximize the thermal recovery from a geothermal well. In some implementations, a working fluid may be injected into a geothermal formation via natural and/or artificial fractures within the geothermal formation. An injection well and a production well may be formed in the geothermal formation to inject and produce the working fluid, respectively. In some implementations, the working fluid may short circuit through one or more thief zones between the injection well and production well, rather than taking a more tortuous path through the formation. This may result in the overall thermal recovery of the system diminishing due to limited formation contact with the working fluid. In some implementations, forcing the working fluid to interact with as much of the formation as possible and also restricting zones that have been overcooled by injection flow may increase the system efficiency and overall recovery.

In some implementations, the working fluid may be a supercritical fluid, such as carbon dioxide ($CO_2$). In some implementations, supercritical $CO_2$ may provide a number of advantages over other working fluids, such as water, for a geothermal system. For example, $CO_2$ may extract heat from the geothermal formation more efficiently, circulate more easily through the formation, reduce scaling of pipes and other downhole tools, etc. Another advantage of $CO_2$ may be the wide density variance that may occur in the fluid over a temperature range (e.g., 60 degrees Celsius (C) to 200 C) typically seen in geothermal formations at reservoir pressure (e.g., 5,000 pounds per square inch (psi) to 10,000 psi). For example, the density may vary from less than 0.8 specific gravity (SG) at about 180 C to 1.05 SG at 60 C while maintaining a reservoir pressure of 10,000 psi. As the temperature of the supercritical $CO_2$ increases, the density of the supercritical $CO_2$ may decrease at reservoir conditions. Thus, tools or zones that may be producing $CO_2$ from colder or overcooled portions of the formation may be restricted, while hot $CO_2$ (i.e., a lesser density) may be preferentially produced.

In some implementations, one or more components may inject a supercritical fluid (such as supercritical $CO_2$) into a subsurface formation. For example, a compressor may pump supercritical $CO_2$ to an injection well, where the supercritical $CO_2$ may be injected into fractures of a geothermal formation to recover the thermal energy of the geothermal energy. In some implementations, the supercritical fluid may flow to a production well to produce the heated supercritical fluid and recover the thermal energy. In some implementations, one or more flow control assemblies may be positioned in the production wellbore. Each flow control assembly may be configured to control the flow of the supercritical fluid into the production wellbore based on the density of the supercritical fluid. In some implementations, the flow control assembly may be configured to detect the density of the supercritical fluid in the geothermal formation proximate the location of the flow control assembly. The flow control assembly may subsequently control the flow of the supercritical fluid into the wellbore at said location based on the density of the supercritical fluid. For example, if the density of the supercritical fluid is above a threshold, the flow control assembly may restrict the flow of the supercritical fluid from the geothermal formation into the wellbore. If the density of the supercritical fluid is below the threshold, then the flow control assembly may open to allow the supercritical fluid to flow from the geothermal formation into the wellbore. Thus, the supercritical fluid from the highest temperature regions of the geothermal formation may be produced via the one or more flow control assemblies, resulting in an increase in the thermal recovery and the efficiency of the geothermal system.

Example Systems

FIG. 1 is a schematic depicting an example geothermal system, according to some implementations. In particular, FIG. 1 is a schematic of a geothermal system 100 that includes a production wellbore 102 and an injection wellbore 110 in a subsurface formation 101. In some implementations, a working fluid may be obtained from a source such as a power plant, a carbon capture plant, etc. The working fluid may include a supercritical fluid, such as supercritical CO2. Injection components 116 (such as a compressor, pump, etc.) may pump the working fluid into the casing 112 of the injection wellbore 110, via the wellhead 114, to inject the working fluid into the subsurface formation 101 via one or more inflow control device, such as inflow control devices 120-124. The inflow control devices 120-124 may include a nozzle inflow control device and/or other suitable inflow control devices configured to regulate the flow of the working fluid into the subsurface formation. In some implementations, there may be perforations, screens, or any other suitable wellbore completion tools and/or configurations that allow the injected working fluid to flow into the subsurface formation 101. In some implementations, the injection wellbore 110 may include packers 126 and 128 to control the flow of the working fluid to the inflow control devices 120-124. The packers 126 and 128 may include any suitable packer type for zonal isolation in a wellbore such as a swell metal packer.

In some implementations, the subsurface formation may include fractures (artificial and/or natural). The working fluid, when injected into the subsurface formation 101, via the injection wellbore 110, may flow through said fractures towards the production wellbore 102. When exposed to the subsurface formation 101, the temperature of the working fluid may increase due to the geothermal heat of the subsurface formation 101. In some implementations, the working fluid may short circuit through the fractures of the subsurface formation, limiting the exposure of the working fluid to the heat of the subsurface formation 101. Alternatively, or in addition to, one or more areas within the subsurface formation 101 may be cooled due to increased exposure to the working fluid.

The production wellbore 102 includes casing 104 and one or more flow control assemblies, such as flow control assemblies 130, 132, and 134, coupled with the casing 104. Each of the flow control assemblies 130-134 may include an electric inflow control device, an autonomous density inflow control device, nozzle inflow control device, etc. Each of the flow control assemblies 130-134 may be configured to control the flow of the working fluid into the casing 104 of the production wellbore 102 based on the density of the working fluid. Any suitable combination flow control assembly components (e.g., valves, sensors, etc.) may be utilized to control the flow of the supercritical working fluid into the production wellbore 102.

In some implementations, a flow control assembly may be configured with one or more sensors that may measure the density of the working fluid in the subsurface formation 101 proximate the respective flow control assembly. Components of the flow control assembly (such as a valve) may then be controlled electronically (e.g., open or close a valve) to control the flow of the working fluid into the casing 104 based on the density measurements. The flow control assembly may open to increase the flow of the working fluid into the casing 104 when the density is less than a density threshold. The flow control assembly may close to restrict the flow of the working fluid into the casing 104 when the density is greater than a density threshold. The flow control assembly may open back up to increase the flow of the working fluid into the casing 104 when the density returns to below the density threshold.

In some implementations, a flow control assembly may include a mechanical system that may control the flow of the working fluid based on the working fluid density. For example, a float component of the flow control assembly may move between an open position and a closed position based on the density of the working fluid to increase or restrict the flow, respectively. The float component may be designed based on the working fluid. For example, the float component may be designed for a supercritical CO2 working fluid such that the float component will open or close based on a density threshold of the supercritical CO2. If the working fluid density is less than a threshold, then the float component may move to the open position, resulting in an increase in working fluid flowing into the casing 104. If the working fluid density is greater than a threshold, then the float component may move to the closed position, resulting in a restriction of working fluid flowing into the casing 104.

In some implementations, the flow control assembly may be a nozzle inflow control device in which the orifice of the nozzle inflow control device regulates the flow of the working fluid based on the density of the working fluid. For example, if the density of the working fluid is greater than a threshold, then flow into the casing 104 may be restricted. Alternatively, if the density of the working fluid is less than a threshold, then the flow into the casing 104 may be increased. The nozzle may be sized based on the type of working fluid to regulate the flow based on the working fluid density.

In some implementations, when restricting fluid flow, the flow control assembly may not fully close (i.e., the flow control assembly may be 95% closed), to allow the flow control assembly to continuously sample the working fluid in the formation. For example, if the flow control assembly is completely closed (allowing no working fluid to flow into the casing 104), there may be no new working fluid for one or more sensors to detect and determine density variance. Thus, the flow control assembly may not reopen due to no change in fluid density. Therefore, the flow control assembly may remain partially opened to allow a small amount of working fluid to flow into the casing 104 to continuously detect the working fluid density.

Each of the flow control assemblies positioned in a wellbore may act independently of each other. For example, the flow control assembly 130 may be open due to the density of the supercritical fluid in the geothermal formation near the flow control assembly 130 being less than the threshold. The flow control assembly 134 may be closed due to the density of the supercritical fluid in the geothermal formation near the flow control assembly 134 may be greater than the threshold.

In some implementations, the production wellbore 102 may include one or more packers, such as packers 136 and 138, positioned between the flow control assemblies 130-134. The packers 136, 138 may create zonal isolation between the flow control assemblies 130-134. The packers 136, 138 may be any suitable packer configured for zonal isolation, such as a swell metal packer.

Once the working fluid flows into the casing 104, via the one or more flow control assemblies 130-134, the working fluid may flow to the surface 111 where it may flow through the wellhead 106 of the production wellbore 102 to a thermal energy recovery system 108. The thermal energy recovery system 108 may include a steam plant, thermoelectric generators, or any other suitable systems configured to utilize the thermal energy recovered in the working fluid. In some implementations, the thermal energy recovery system 108 may be a part of the same system as the injection components 116. For example, the thermal energy recovery system 108 and the injection components 116 may both be a part of a steam plant. The heated working fluid may be produced from the production wellbore 102 and sent to the steam plant. Once cooled, the working fluid may then flow to a compressor at the steam plant which may then return the cooled fluid back to the injection wellbore 110 for injection.

The geothermal system 100 depicted in FIG. 1 depicts two horizontal wellbores. The control of the flow of a working fluid based on the working fluid density, via one or more flow control assemblies, may be applicable to any other suitable wellbore configurations utilized in geothermal operations. For example, one or more of the wellbores (either the production well, injection well(s), or both) may be vertical, there may be multiple injection wells offset to the production well, there may only be a single wellbore that acts as the injection well and the production well (i.e., a geothermal energy storage system), etc.

Figure 4:
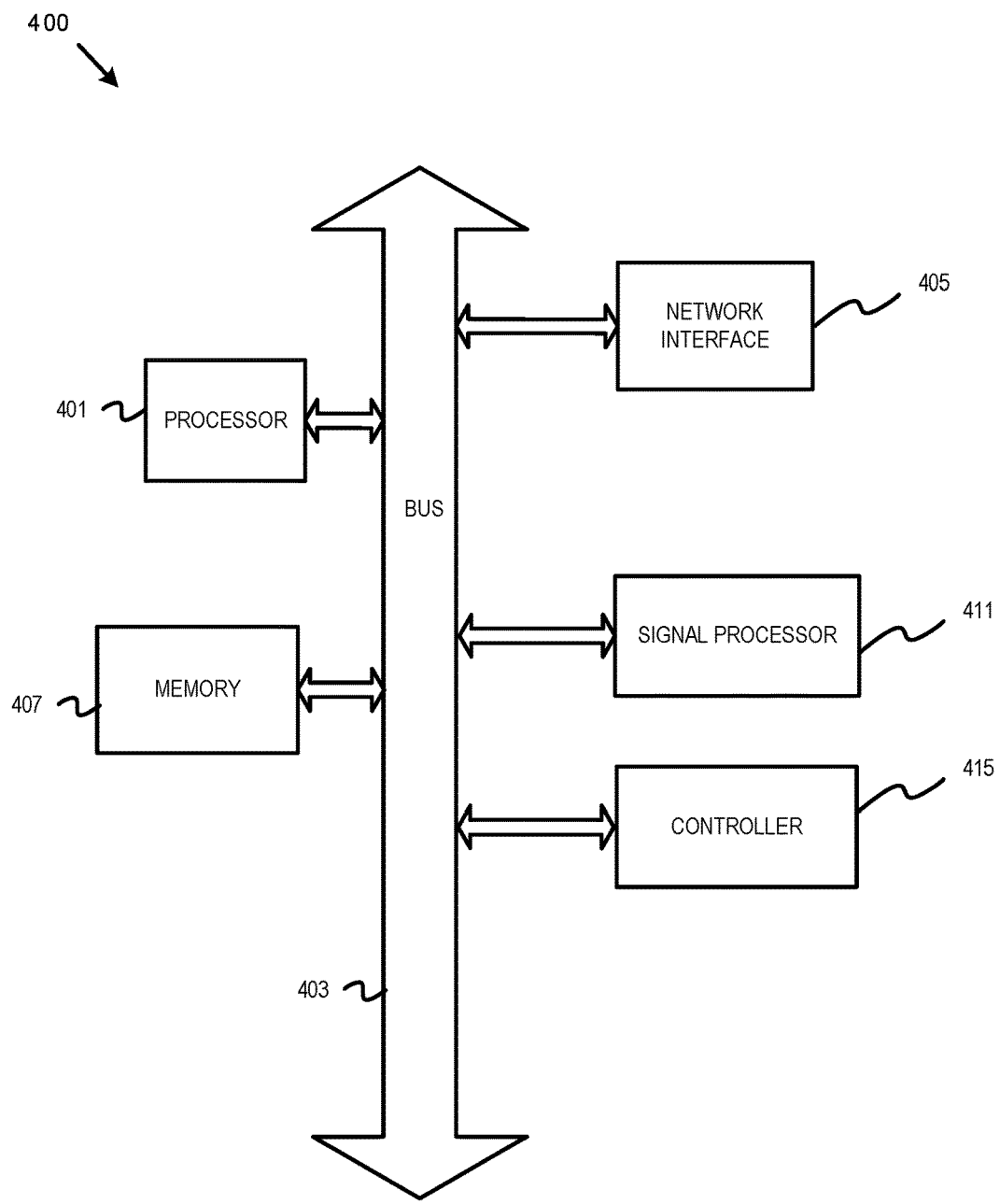
FIG. 4 is a block diagram depicting an example computer, according to some implementations.

The geothermal system 100 includes a computer 170 that may be communicatively coupled to other parts of the geothermal system 100. The computer 170 may be local or remote to the geothermal system 100. A processor of the computer 170 may perform simulations (as further described below). In some implementations, the processor of the computer 170 may control geothermal operations of the geothermal system 100 or subsequent geothermal operations of other wellbores. For instance, the processor of the computer 170 may determine the density of the working fluid based on measurements obtained from the flow control assemblies 130-134 and control the flow control assemblies 130-134 based on the density of the working fluid. An example of the computer 170 is depicted in FIG. 4, which is further described below.

Example Operations

Figure 2:
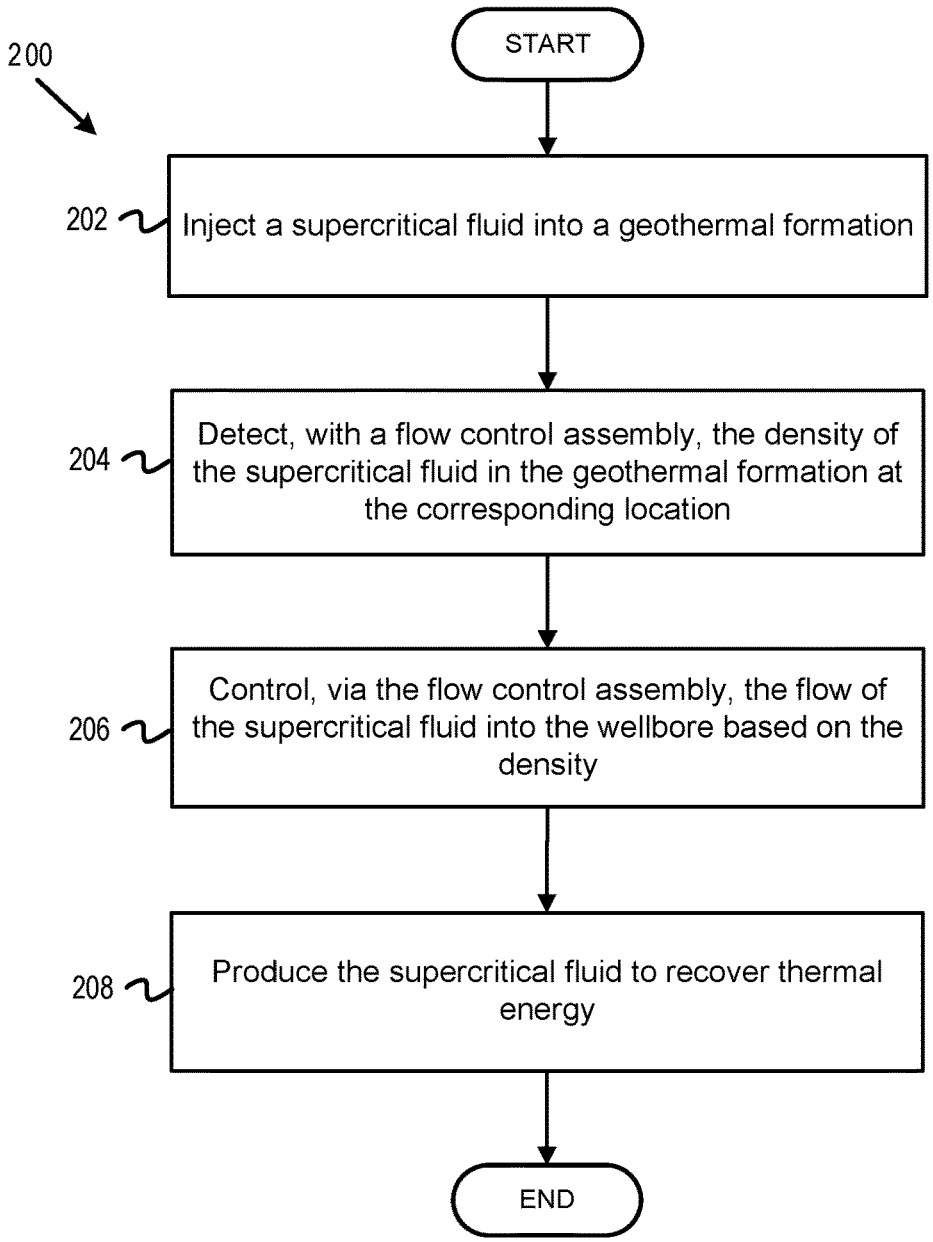
FIG. 2 is a flowchart of example operations for controlling the flow of a supercritical working fluid into a wellbore based on the supercritical working fluid density, according to some implementations.

FIG. 2 is a flowchart of example operations for controlling the flow of a supercritical working fluid into a wellbore based on the supercritical working fluid density, according to some implementations. FIG. 2 depicts a flowchart 200 of operations to inject a supercritical working fluid into a subsurface formation and control, via one or more flow control assemblies, the flow of the supercritical working fluid into a wellbore based on the supercritical fluid density. The operations of flowchart 200 are described in reference to the processor of the computer 170 and flow control assemblies 130-134 of FIG. 1. The operations are described in reference to one flow control assembly positioned in a wellbore. In some implementations, more than one flow control assembly may be positioned in a wellbore. Additionally, the operations of flowchart 200 are described in reference to FIG. 3. Operations of the flowchart 200 begin at block 202.

At block 202, the processor of the computer 170 may inject a supercritical fluid into a geothermal formation. The supercritical fluid may act as the working fluid for a geothermal system, as described in FIG. 1. One or more components including a pump, compressor, etc. may inject the supercritical fluid into the geothermal formation via an injection well, such as injection wellbore 110 of FIG. 1, to absorb the thermal energy of the geothermal formation. In some implementations, the supercritical fluid may permeate the geothermal formation via natural and/or artificial fractures. The supercritical fluid may flow through the geothermal formation towards a producing well to ultimately be produced to surface to recover the thermal energy (as described in blocks 204-208 below). In some implementations, the injection well may also act as the producing well. For example, the supercritical fluid may be injected into the geothermal formation to store the supercritical fluid and then the wellbore may be shut in. After some period of time, the high temperature supercritical fluid that may have absorbed thermal energy from the geothermal formation may be produced up the same wellbore when the wellbore is re-opened.

Figure 3:
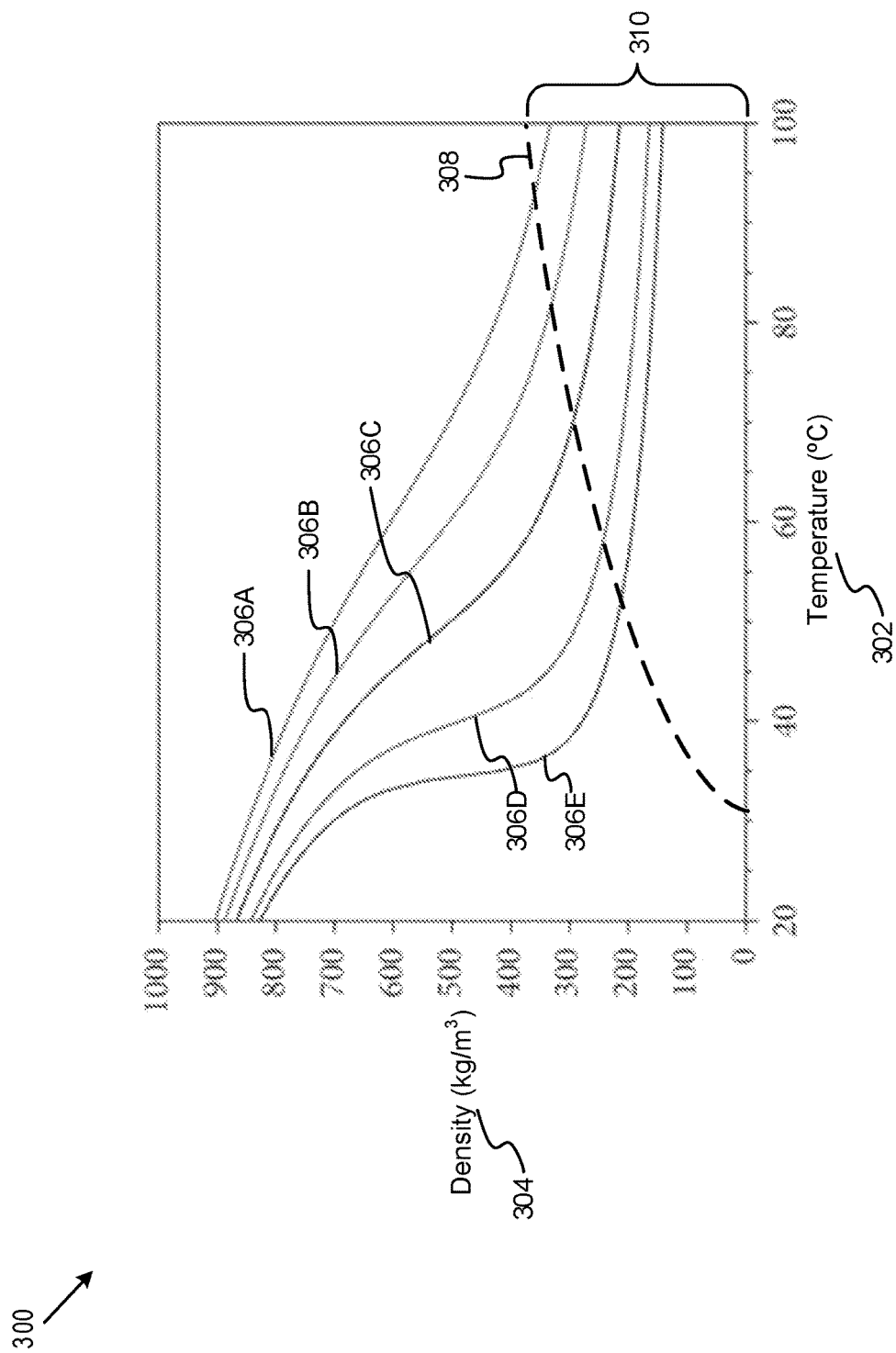
FIG. 3 is an illustration depicting an example chart of a phase diagram of carbon dioxide, according to some implementations.

In some implementations, the supercritical fluid may be supercritical carbon dioxide (CO2). To help illustrate, FIG. 3 is an illustration depicting an example chart of a phase diagram of carbon dioxide, according to some implementations. In particular, FIG. 3 includes a CO2 phase diagram 300 at example downhole geothermal temperatures and pressures. The CO2 phase diagram 300 includes an x-axis 302 and a y-axis 304. The x-axis 302 is the temperature having units in degrees Celsius (° C.). The y-axis 304 is the density having units in kilograms per cubic meter (kg/m$^3$). The CO2 phase diagram also includes pressure curves 306A-306E, having units in Megapascals (MPa). A supercritical fluid may be a substance above it's critical point where distinct liquid and gas phases do not exist. As shown in the CO2 phase diagram 300, CO2 is in a supercritical phase when in an environment within the supercritical region 310. The supercritical region 310 lies below the supercritical boundary 308. The wide density variance that may occur at geothermal formation temperatures and pressures may allow for increased thermal recovery of a geothermal system when supercritical CO2 is utilized as the working fluid. In some implementations, other supercritical fluids may be used as the working fluid.

At block 204, the processor of the computer 170 may detect, with a flow control assembly, the density of the supercritical fluid in the geothermal formation at the corresponding location. In some implementations, a flow control assembly (such as flow control assemblies 130-134 of FIG. 1) may be positioned in a wellbore to control the flow of the supercritical fluid from the geothermal formation into the wellbore based on the supercritical fluid density (as described in FIG. 1). For example, the flow control assembly may include one or more sensors configured to measure the density of the supercritical fluid in the geothermal formation proximate the flow control assembly (i.e., the supercritical fluid external to the wellbore).

At block 206, the processor of the computer 170 may control, via the flow control assembly, the flow of the supercritical fluid into the wellbore based on the density. The flow control assembly may control the flow of fluid into the wellbore from the geothermal formation, as described in FIG. 1. To maximize thermal recovery, the flow control assembly may increase the flow of the supercritical fluid into the wellbore when it is hot, and restrict the flow of the supercritical fluid into the wellbore when it is cool (relative to a geothermal temperature). Accordingly, when the density is below a threshold (i.e., the fluid is hot), then the flow control assembly may open to increase the flow of the supercritical fluid into the wellbore. When the density is above the threshold (i.e., the fluid is cool, due to various reasons such as short circuiting through fractures of the geothermal formation), then the flow control assembly may restrict the flow of the supercritical fluid into the wellbore. In some implementations, when the flow control assembly is closed, the flow control assembly may open again to increase the flow of the supercritical fluid once the density of the supercritical fluid returns to below the threshold.

At block 208, the processor of the computer 170 may produce the supercritical fluid to recover thermal energy. The supercritical fluid with a density less than a threshold that has flowed into the wellbore, via one or more flow control assemblies, may flow to the surface and then proceed to systems that may utilize the thermal energy. For example, the heated supercritical fluid may flow to a power plant to generate power via the thermal energy.

Example Computer

FIG. 4 is a block diagram depicting an example computer, according to some implementations. FIG. 4 depicts a computer 400 for controlling the flow of a working fluid in a geothermal system based on the density of the working fluid. The computer 400 includes a processor 401 (possibly including multiple processors, multiple cores, multiple nodes, and/or implementing multi-threading, etc.). The computer 400 includes memory 407. The memory 407 may be system memory or any one or more of the above already described possible realizations of machine-readable media. The computer 400 also includes a bus 403 and a network interface 405. The computer 400 can communicate via transmissions to and/or from remote devices via the network interface 405 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 400 also includes a signal processor 411 and a controller 415 which may perform the operations described herein. For example, the signal processor 411 may measure the density of a supercritical fluid in a geothermal formation. The controller 415 may control a flow control assembly based on the density of the supercritical fluid. The signal processor 411 and the controller 415 can be in communication. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for flow control of a supercritical fluid as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Implementations

Implementation #1: An apparatus to be positioned in a geothermal wellbore formed in a subsurface formation, the apparatus comprising: one or more components to inject a supercritical fluid into the subsurface formation; and a flow control assembly configured to control flow of the supercritical fluid into the geothermal wellbore based on a density of the supercritical fluid in the subsurface formation.

Implementation #2: The apparatus of Implementation #1, wherein the supercritical fluid includes supercritical CO2.

Implementation #3: The apparatus of Implementation #1 or 2, wherein the flow control assembly opens to increase the flow of the supercritical fluid into a tubular string when the density is less than a density threshold.

Implementation #4: The apparatus of any one or more of Implementations #1-3, wherein the flow control assembly restricts the flow of the supercritical fluid into a tubular string when the density is greater than a density threshold.

Implementation #5: The apparatus of Implementation #4, wherein the flow control assembly opens to increase the flow of the supercritical fluid into the tubular string when the density returns to below the density threshold.

Implementation #6: The apparatus of any one or more of Implementations #1-5, wherein the flow control assembly includes an electric inflow control device, an autonomous density inflow control device, and a nozzle inflow control device.

Implementation #7: The apparatus of any one or more of Implementations #1-6, wherein the subsurface formation is a geothermal formation.

Implementation #8: A method comprising: injecting a supercritical fluid into a subsurface formation; detecting, with a flow control assembly positioned at a first location in a wellbore, a density of the supercritical fluid in the subsurface formation proximate the first location; and controlling, via the flow control assembly, flow of the supercritical fluid into the wellbore at the first location based on the density of the supercritical fluid proximate the first location.

Implementation #9: The method of Implementation #8, wherein the supercritical fluid includes supercritical CO2.

Implementation #10: The method of Implementation #8 or 9, wherein the flow control assembly opens to increase the flow of the supercritical fluid into the wellbore at the first location when the density is less than a density threshold.

Implementation #11: The method of any one or more of Implementations #8-10, wherein the flow control assembly restricts the flow of the supercritical fluid into the wellbore at the first location when the density is greater than a density threshold.

Implementation #12: The method of any one or more of Implementations #8-11, wherein the flow control assembly opens to increase the flow of the supercritical fluid into the wellbore at the first location when the density returns to below the density threshold.

Implementation #13: The method of any one or more of Implementations #8-12, wherein the flow control assembly includes an electric inflow control device, an autonomous density inflow control device, and nozzle inflow control device.

Implementation #14: The method of any one or more of Implementations #8-13, wherein the supercritical fluid is injected into the subsurface formation via the wellbore or one or more offset wellbores.

Implementation #15: A system comprising: one or more components to inject a supercritical fluid into a subsurface formation; a flow control assembly configured to control flow of the supercritical fluid into a geothermal wellbore positioned in the subsurface formation based on a density of the supercritical fluid in the subsurface formation; and a thermal energy recovery system configured to recover a thermal energy from the supercritical fluid after the supercritical fluid is produced from the geothermal wellbore.

Implementation #16: The system of Implementation #15, wherein the supercritical fluid includes supercritical CO2.

Implementation #17: The system of Implementation #15 or 16, wherein the flow control assembly opens to increase the flow of the supercritical fluid into a tubular string when the density is less than a density threshold.

Implementation #18: The system of any one or more of Implementations #15-17, wherein the flow control assembly restricts the flow of the supercritical fluid into a tubular string when the density is greater than a density threshold.

Implementation #19: The system of any one or more of Implementations #15-18, wherein the flow control assembly includes an electric inflow control device, an autonomous density inflow control device, and nozzle inflow control device.

Implementation #20: The system of any one or more of Implementations #15-19, wherein the subsurface formation is a geothermal formation.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. An apparatus to be positioned in a geothermal wellbore formed in a subsurface formation, the apparatus comprising:
   one or more components to inject a supercritical fluid into the subsurface formation; and
   a flow control assembly positioned at a first downhole location in the geothermal wellbore and configured with one or more electronically controlled components to control flow of the supercritical fluid into the geothermal wellbore from the subsurface formation at the first downhole location based on a density of the supercritical fluid in the subsurface formation proximate the first downhole location, wherein the flow control assembly is configured with one or more sensors to measure the density, and wherein the one or more electronically controlled components are configured to remain at least partially open to continuously detect the density of the supercritical fluid in the subsurface formation.

2. The apparatus of claim 1, wherein the supercritical fluid includes supercritical CO2.

3. The apparatus of claim 1, wherein the flow control assembly opens to increase the flow of the supercritical fluid into a tubular string when the density is less than a density threshold.

4. The apparatus of claim 1, wherein the flow control assembly restricts the flow of the supercritical fluid into a tubular string when the density is greater than a density threshold.

5. The apparatus of claim 4, wherein the flow control assembly opens to increase the flow of the supercritical fluid into the tubular string when the density returns to below the density threshold.

6. The apparatus of claim 1, wherein the subsurface formation is a geothermal formation.

7. The apparatus of claim 1, wherein the one or more electronically controlled components include a valve, and wherein the valve is configured to be electronically controlled to at least partially open or at least partially close.

8. A method comprising:
   injecting a supercritical fluid into a subsurface formation;
   measuring, with a sensor of a flow control assembly positioned at a first downhole location in a wellbore, a density of the supercritical fluid in the subsurface formation proximate the first downhole location; and
   controlling, via one or more electronically controlled components of the flow control assembly, flow of the supercritical fluid into the wellbore at the first downhole location based on the density of the supercritical fluid proximate the first downhole location, wherein the one or more electronically controlled components are configured to remain at least partially open to continuously detect the density of the supercritical fluid in the subsurface formation.

9. The method of claim 8, wherein the supercritical fluid includes supercritical CO2.

10. The method of claim 8, wherein the flow control assembly opens to increase the flow of the supercritical fluid into the wellbore at the first downhole location when the density is less than a density threshold.

11. The method of claim 8, wherein the flow control assembly restricts the flow of the supercritical fluid into the wellbore at the first downhole location when the density is greater than a density threshold.

12. The method of claim 11, wherein the flow control assembly opens to increase the flow of the supercritical fluid into the wellbore at the first downhole location when the density returns to below the density threshold.

13. The method of claim 8, wherein the supercritical fluid is injected into the subsurface formation via the wellbore or one or more offset wellbores.

14. A system comprising:
   one or more components to inject a supercritical fluid into a subsurface formation;
   a nozzle flow control assembly positioned at a first downhole location in a geothermal wellbore and configured to control flow of the supercritical fluid into the geothermal wellbore from the subsurface formation at the first downhole location based on a density of the supercritical fluid in the subsurface formation proximate the first downhole location, wherein the nozzle flow control assembly is configured with one or more sensors to measure the density; and
   a thermal energy recovery system configured to recover a thermal energy from the supercritical fluid after the supercritical fluid is produced from the geothermal wellbore.

15. The system of claim 14, wherein the supercritical fluid includes supercritical CO2.

16. The system of claim 14, wherein the nozzle flow control assembly opens to increase the flow of the supercritical fluid into a tubular string when the density is less than a density threshold.

17. The system of claim 14, wherein the nozzle flow control assembly restricts the flow of the supercritical fluid into a tubular string when the density is greater than a density threshold.

18. The system of claim 14, wherein the subsurface formation is a geothermal formation.

19. The system of claim 14, wherein an orifice of the nozzle flow control assembly regulates the flow of the supercritical fluid into the geothermal wellbore.

* * * * *